United States Patent
Patel et al.

(10) Patent No.: US 9,729,307 B1
(45) Date of Patent: Aug. 8, 2017

(54) METHOD AND APPARATUS FOR DETECTION OF BOUNDARY BETWEEN TRANSMISSION AND RECEPTION IN TDD COMMUNICATION SYSTEMS

(71) Applicant: MBIT WIRELESS, INC., Newport Beach, CA (US)

(72) Inventors: Bhaskar Patel, San Clemente, CA (US); Sivakumar Govindassamy, San Diego, CA (US); Arumugam Govindswamy, Irvine, CA (US)

(73) Assignee: MBIT WIRELESS, INC., Irvine, CA (US)

( * ) Notice: Subject to any disclaimer, the term of this patent is extended or adjusted under 35 U.S.C. 154(b) by 127 days.

(21) Appl. No.: 14/821,957

(22) Filed: Aug. 10, 2015

(51) Int. Cl.
*H04B 7/212* (2006.01)
*H04L 5/16* (2006.01)
*H04L 5/14* (2006.01)
*H04L 27/26* (2006.01)
*H04L 7/08* (2006.01)

(52) U.S. Cl.
CPC .............. *H04L 5/16* (2013.01); *H04L 5/1469* (2013.01); *H04L 7/08* (2013.01); *H04L 27/2601* (2013.01)

(58) Field of Classification Search
CPC ....... H04L 5/14; H04L 5/1423; H04L 5/0007; H04L 27/206; H04L 2012/5608; H04W 80/04; H04W 8/26; H04W 84/12; H04W 88/08; H04J 11/00
USPC ..... 370/276, 349, 208, 203, 310.2, 328, 338
See application file for complete search history.

(56) References Cited

U.S. PATENT DOCUMENTS

| | | | |
|---|---|---|---|
| 8,798,208 B2 * | 8/2014 | Shin | H04L 7/042 375/259 |
| 2009/0270122 A1 * | 10/2009 | Chmiel | H04J 11/0093 455/550.1 |
| 2011/0317780 A1 * | 12/2011 | Kang | H04L 5/0007 375/260 |
| 2013/0122822 A1 * | 5/2013 | Srinivasan | H04J 11/0073 455/67.13 |

* cited by examiner

*Primary Examiner* — Brenda H Pham
(74) *Attorney, Agent, or Firm* — Lerner, David, Littenberg, Krumholz & Mentlik, LLP

(57) ABSTRACT

In many wireless communication systems, there is a major problem with the coverage in indoor environments because of signal loss during signal penetration through walls and other structures. Femto cells or repeaters may be used to address the signal coverage issue for indoor environments. The cost of femto cells or repeaters may be high depending on its capabilities. Method and apparatus are disclosed for a Signal Enhancer with reduced complexity to enhance the signal for an OFDM based TDD wireless communication system. This may result in a lower cost solution for improving the coverage and the overall communication system performance.

24 Claims, 18 Drawing Sheets

FIG. 6

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

D = DL subframe
U = UL subframe
S = Special subframe

FIG. 8

| Special subframe configuration | Normal cyclic prefix in downlink | | | | Extended cyclic prefix in downlink | | |
|---|---|---|---|---|---|---|---|
| | DwPTS | UpPTS | | DwPTS | UpPTS | | |
| | | Normal cyclic prefix in uplink | Extended cyclic prefix in uplink | | Normal cyclic prefix in uplink | Extended cyclic prefix in uplink | |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ | |
| 1 | $19760 \cdot T_s$ | | | $20480 \cdot T_s$ | | | |
| 2 | $21952 \cdot T_s$ | | | $23040 \cdot T_s$ | | | |
| 3 | $24144 \cdot T_s$ | | | $25600 \cdot T_s$ | | | |
| 4 | $26336 \cdot T_s$ | | | $7680 \cdot T_s$ | | | |
| 5 | $6592 \cdot T_s$ | $4384 \cdot T_s$ | $5120 \cdot T_s$ | $20480 \cdot T_s$ | $4384 \cdot T_s$ | $5120 \cdot T_s$ | |
| 6 | $19760 \cdot T_s$ | | | $23040 \cdot T_s$ | | | |
| 7 | $21952 \cdot T_s$ | | | $12800 \cdot T_s$ | | | |
| 8 | $24144 \cdot T_s$ | | | - | - | - | |
| 9 | $13168 \cdot T_s$ | | | - | - | - | |

$T_s = 1/(30.72 \times 10^6)$

METHOD AND APPARATUS FOR DETECTION OF BOUNDARY BETWEEN TRANSMISSION AND RECEPTION IN TDD COMMUNICATION SYSTEMS

BACKGROUND

Typically, as shown in FIG. 1, a wireless communication system 10 comprises elements such as client terminal or mobile station 12 and base stations 14. Other network devices which may be employed, such as a mobile switching center, are not shown. In some wireless communication systems, there may be only one base station and many client terminals while in some other communication systems such as cellular wireless communication systems there are multiple base stations and a large number of client terminals communicating with each base station.

As illustrated, the communication path from the base station (BS) to the client terminal direction is referred to herein as the downlink (DL) and the communication path from the client terminal to the base station direction is referred to herein as the uplink (UL). In some wireless communication systems, the client terminal or mobile station (MS) communicates with the BS in both DL and UL directions. For instance, this is the case in cellular telephone systems. In other wireless communication systems, the client terminal communicates with the base stations in only one direction, usually the DL. This may occur in applications such as paging.

The base station with which the client terminal is communicating is referred to as the serving base station. In some wireless communication systems, the serving base station is normally referred to as the serving cell. While in practice a cell may include one or more base stations, a distinction is not made between a base station and a cell, and such terms may be used interchangeably herein. The base stations that are near the serving base station are called neighbor cell base stations. Similarly, in some wireless communication systems a neighbor base station is normally referred to as a neighbor cell.

Duplexing refers to the ability to provide bidirectional communication in a system, i.e., from base station to client terminals (DL) and from client terminals to base station (UL). There are different methods for providing bidirectional communication. One of the commonly used duplexing method is the Frequency Division Duplexing (FDD) as shown in FIG. 2(A). In FDD wireless communication systems, two different frequencies, one for DL and another for UL are used for communication. In FDD wireless communication system, the client terminals may be receiving and transmitting simultaneously.

Another commonly used method is the Time Division Duplexing (TDD). In TDD based wireless communication systems, the same exact frequency is used for communication in both DL and UL. In TDD wireless communication systems, the client terminals may be either receiving or transmitting but not both simultaneously. The use of the Radio Frequency (RF) channel for DL and UL may alternate on periodic basis. For example, in every 5 ms time duration, during the first half, the RF channel may be used for DL and during the second half; the RF channel may be used for UL. In some communication systems, the time duration for which the RF channel is used for DL and UL may be adjustable and may be changed dynamically. In some communication systems, a predefined set of configurations may be used to select between different DL and UL duration ratios as shown in FIG. 2(B) with two different configurations. These predefined configurations are referred herein as TDD configurations.

Yet another commonly used duplexing method is the Half-duplex FDD (H-FDD) as shown in FIG. 2(C). In this method, different frequencies are used for DL and UL but the client terminals may not perform receive and transmit operations at the same time. Similar to TDD wireless communication systems, a client terminal using H-FDD method must periodically switch between DL and UL operation.

The TDD duplexing method has the advantage of enabling simpler implementation of the RF and baseband components of the client terminal since either only transmit or only receive may be active at any given time.

For the client terminal to be able to successfully receive and transmit signals in DL and UL directions respectively, it is essential for the client terminal to know the timing of the signals in both DL and UL directions. The timing for the signals from the client terminals to the base station may depend on various factors, but primarily on the position of the client terminals with respect to the base station. Most wireless communications systems broadcast some type of beacon signal to help the client terminals synchronize to the network. A client terminal may use this beacon signal to establish time and frequency synchronization with the base station.

In a TDD wireless communication system, the timing of the signal from client terminals to the base station (UL) may further depend on the boundary between the DL and UL at the base station. In TDD wireless communication systems, the base station generally broadcasts system information about the starting time of the UL direction. Client terminals may receive the system information about the DL and UL switching point and other information before attempting communication in the UL direction.

In many wireless communication application scenarios, the users may be more likely to be in indoor environments such as in homes and offices. Users may be in outdoor environments when going from one indoor environment to another indoor environment, for example going from home to office and vice a versa. However, in most wireless communication systems there is a major problem with the coverage of indoor environments because of signal loss during penetration of the signals through walls and other structures. In the newly emerging Machine Type Communication (MTC) applications, the machine type devices may be located deep inside building structures where the signal from base station may experience very high penetration loss. To enable MTC applications it may be essential to improve indoor coverage for reliable communication. Therefore, it may be important to find methods and apparatuses that can improve the signal coverage for indoor environments for reliable communication.

Different approaches may be used to address the signal coverage issues. One approach may be to have layers of base stations where one layer of base stations with high power and tall antenna towers covering a large area and another layer with lower power nodes with possibly lower height antennas may be installed on the exterior or interior of office buildings and houses. The base stations with higher power are normally referred as macro cells. The lower power nodes in the second layer may include nodes with different capabilities such as femto cells, Relay Stations, Remote Radio Heads, etc.

The use of repeaters may be another approach to improve coverage and performance. Repeaters are typically mounted in an advantageous position for signal reception from the base station. This may be either on the exterior of the building or a house or it may be interior to the building at a location where the signal strength and quality may be better. A repeater receives the signal from a base station, boosts it and then retransmits it to the interior of the building or a house. Similarly, the signals from the client terminals inside the building are received by the repeater, which are then boosted and transmitted to a base station. In general, the repeater may be transparent to the client terminals that are near the repeater even though they may be sending and receiving the information through the repeater.

Different types of repeaters are used in practice. For example, On-Frequency Repeater (OFR) where the boosted signal is retransmitted on the same channel as that of the original channel from the base station. Another example is Frequency Shifting Repeater (FSR) or Frequency Translating Repeater (FTR) where the boosted signal is retransmitted on a channel that is different from the original channel used by the base station.

Repeaters may have the advantage that they are much less complex compared to a conventional base station in a femto cell. Furthermore, repeaters may not require use of any additional RF channels from the network operator (although some repeater implementations may use other RF channels from the network operator's licensed frequency bands or may use unlicensed frequency bands such as Industrial, Scientific and Medical (ISM) radio band or Unlicensed National Information Infrastructure (UNII) radio band). This may eliminate any frequency resource coordination and planning requirement for the network operator. As a result, repeaters may be lower cost and a preferred alternative in many scenarios to address the coverage issues. A repeater may determine the timing of the UL portion by first receiving the system information in the DL that describes the starting time of the UL direction. However, this may require the repeater to implement a complete RF and baseband receiver or a major part of it. This may normally lead to increased cost.

The entity that may be used to enhance the coverage and performance such as repeater, smart repeater, OFR, FSR, FTR, remote radio head, relay station, etc., is referred herein as Signal Enhancer.

A method and apparatus are described that enable the Signal Enhancer to determine the starting time of the UL direction in a TDD wireless communication system without implementing a complete or major portion of a receiver. This results in a lower cost solution for improving the coverage and the overall communication system performance.

SUMMARY

In accordance with an aspect of the present invention, a method may determine a switching point from downlink (DL) to uplink (UL) in a Time Division Duplexing (TDD) wireless communication system. The method may include controlling, by a processing device, detecting a cyclic prefix (CP) type based only on detection of a Primary Synchronization Signal (PSS) and a Secondary Synchronization Signal (SSS) of a base station; controlling, by a processing device, determining a channel bandwidth used in the base station based on the CP type; controlling, by the processing device, sampling a channel of the base station at a sampling rate corresponding to the channel bandwidth to obtain samples; controlling, by the processing device, determining, from the samples, (i) each DL antenna port of the base station being used by the base station, (ii) TDD configuration of the base station, and (iii) Special Subframes (SSF) configuration of the base station; and controlling, by the processing device, determining of the switching point based on the channel bandwidth, each DL antenna port of the base station determined as being used by the base station, the TDD configuration of the base station and the SSF configuration of the base station.

In one alternative, the determining the channel bandwidth may include controlling, by the processing device, determining CP correlations corresponding to the CP type.

In one alternative, the CP correlations corresponding to the CP type may be determined respectively for CP lengths of all supported channel bandwidths.

In one alternative, the CP correlations respectively for the CP lengths may be determined over a length of a number of Orthogonal Frequency Division Multiplexing (OFDM) symbols, and method may further include controlling, by the processing device, combining the CP correlations to obtain combined CP correlations respectively for the CP lengths.

In one alternative, only CP correlations of the CP correlations corresponding to the OFDM symbols which are known to be DL OFDM signals may be combined in the combining the CP correlations.

In one alternative, the method may include controlling, by the processing device, normalizing the combined CP correlations according to the CP lengths, the length of the number of OFDM symbols and powers respectively of samples used for the CP correlations, to obtain normalized combined CP correlations respectively for the CP lengths.

In one alternative, the method may include controlling, by the processing device, selecting a selected channel bandwidth corresponding to a highest normalized combined CP correlation of the normalized combined CP correlations as the channel bandwidth of the base station.

In one alternative, the method may include controlling, by the processing device: determining, for each possible antenna port of the base station, Reference Signal Received Power (RSRP) of only Orthogonal Frequency Division Multiplexing (OFDM) symbols of the samples which have a Reference Signal (RS); averaging the RSRP determined for each possible antenna port of the base station to obtain an average RSRP; and determining, from the average RSRP for each possible antenna port of the base station, whether each possible antenna port of the base station is a valid antenna port.

In one alternative, the method may include: controlling, by the processing device, determining from the average RSRP for each possible antenna port of the base station, using a first average RSRP for a first possible antenna port of the base station as a reference, whether any of the OFDM symbols having the RS is present at each possible antenna port of the base station other than the first possible antenna port.

In one alternative, whether any of the OFDM symbols having the RS is determined to be present at the other than the first possible antenna port may be based on whether the average RSRP of the other than the first possible antenna port is at least a predetermined fraction of the first average RSRP.

In one alternative, when the average RSRP of the other than the first possible antenna port is determined to be at least the predetermined fraction of the first average RSRP, the other than the first possible antenna port may be determined by the processing device to be a DL antenna port of the base station being used by the base station.

In one alternative, the method may include controlling, by the processing device, determining CP correlation for each OFDM symbol in a frame other than of a subframe of the frame which always is a UL subframe.

In one alternative, the method may include controlling, by the processing device, separately combining and normalizing the CP correlations for each OFDM symbol in each subframe over a predetermined number of frames to obtain normalized combined CP correlations, and determining, as a valid DL OFDM symbol, each of the OFDM symbols for which the normalized combined CP correlation exceeds a predetermined threshold.

In one alternative, the predetermined threshold is a fraction of the normalized combined CP correlation for the OFDM symbols known to be valid DL OFDM symbols with a Reference Signal (RS) in a Resource Element (RE).

In one alternative, the method may include controlling, by the processing device, determining a difference between expected DL OFDM symbols with a Reference Signal (RS) for each possible TDD configuration indicated in a stored table with each DL OFDM symbol with a RS determined to be valid, and determining, as a TDD configuration of the base station, the TDD configuration indicated in the table having the expected DL OFDM symbols with a RS closest to the DL OFDM symbols with a RS determined to be valid.

In one alternative, the SSF configuration may be determined by determining CP correlations over a maximum possible number of DL Orthogonal Frequency Division Multiplexing (OFDM) symbols in a SSF.

In one alternative, the method may include controlling, by the processing device, combining and normalizing the CP correlations separately for each of the OFDM symbols over a predetermined number of frames to obtain normalized combined CP correlations, comparing the normalized combined CP correlations of all the OFDM symbols in the SSF with a predetermined fraction of a first normalized combined correlation of a first DL OFDM symbol in the SSF containing a Reference Signal (RS) of the DL OFDMs in the SSF, and determining, as a valid DL OFDM symbol in SSF, each of the DL OFDM symbols in the SSF for which the normalized combined CP correlation exceeds the predetermined fraction of the first normalized combined correlation of the first DL OFDM symbol in the SSF.

In one alternative, the method may include controlling, by the processing device, determining a difference between a profile of each DL OFDM symbol in a SFF determined to be valid and expected profiles of DL OFDM symbols in SSF for each possible SSF configuration indicated in a stored table; and controlling, by the processing device, determining, as the SSF configuration of the base station, the SSF configuration indicated in the table having the expected profile of DL OFDM symbols in the SSF closest to the profile of the DL OFDM symbols in the SSF determined to be valid.

In one alternative, the method may include controlling, by the processing device, storing in a memory the channel bandwidth, the CP type, each DL antenna ports of the base station determined as being used by the base station, the TDD configuration of the base station and the SSF configuration of the base station.

In one alternative, the method may include controlling, by the processing device, discarding at least one of the channel bandwidth, the CP type, the DL antenna ports of the base station being used by the base station, the TDD configuration of the base station or the SSF configuration of the base station from the memory based on elapsed time.

In one alternative, the method may include controlling, by the processing device, switching of camping on from the base station to a second base station using hysteresis.

In one alternative, the method may include controlling, by the processing device, switching of camping on from the base station to a second base station only when a predetermined time has elapsed since last camping on to the second base station.

In accordance with an aspect of the present invention, an apparatus may determine a switching point from downlink (DL) to uplink (UL) in a Time Division Duplexing (TDD) wireless communication system. The apparatus may include circuitry configured to control: detecting a cyclic prefix (CP) type based only on detection of a Primary Synchronization Signal (PSS) and a Secondary Synchronization Signal (SSS) of a base station; determining a channel bandwidth used in the base station based on the CP type; sampling a channel of the base station at a sampling rate corresponding to the channel bandwidth to obtain samples; determining, from the samples, (i) each DL antenna port of the base station being used by the base station, (ii) TDD configuration of the base station, and (iii) Special Subframes (SSF) configuration of the base station; and determining of the switching point based on the channel bandwidth, each DL antenna port of the base station determined as being used by the base station, the TDD configuration of the base station and the SSF configuration of the base station.

In accordance with an aspect of the present invention, a wireless communication device may include a receiver to receive signals from a base station of a Time Division Duplexing (TDD) wireless communication system; and a processing device configured to determine a switching point from downlink (DL) to uplink (UL) for the base station, wherein the processing device is configured to control: detecting a cyclic prefix (CP) type based only on detection of a Primary Synchronization Signal (PSS) and a Secondary Synchronization Signal (SSS) of the base station; determining a channel bandwidth used in the base station based on the CP type; sampling a channel of the base station at a sampling rate corresponding to the channel bandwidth to obtain samples; determining, from the samples, (i) each DL antenna port of the base station being used by the base station, (ii) TDD configuration of the base station, and (iii) Special Subframes (SSF) configuration of the base station; and determining of the switching point based on the channel bandwidth, each DL antenna port of the base station determined as being used by the base station, the TDD configuration of the base station and the SSF configuration of the base station.

BRIEF DESCRIPTION OF THE DRAWINGS

FIG. 6 lists the different TDD configurations used in 3GPP LTE wireless communication system.

FIG. 8 lists the different special subframe configurations used in 3GPP LTE TDD wireless communication system.

DETAILED DESCRIPTION

Figure 1:
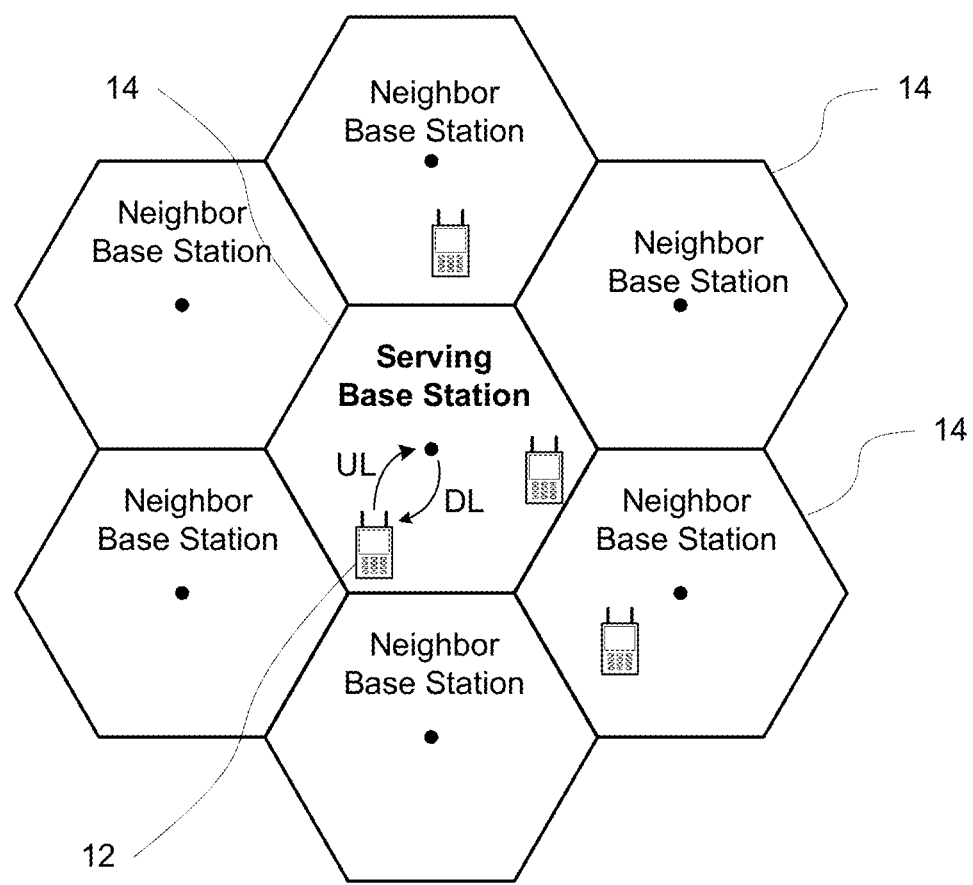
FIG. 1 illustrates a conventional wireless cellular communication system.
Figure 2:
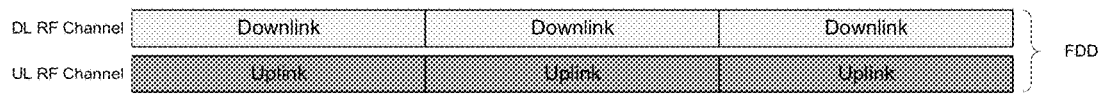
FIGS. 2(A), 2(B) and 2(C) illustrate, respectively, FDD, TDD and H-FDD duplexing techniques.
Figure 2:
Figure 2:

The foregoing aspects, features and advantages of the present invention will be further appreciated when considered with reference to the following description of exemplary embodiments and accompanying drawings, wherein like reference numerals represent like elements. In describing the exemplary embodiments of the invention illustrated in the appended drawings, specific terminology will be used for the sake of clarity. However, the aspects of the invention are not intended to be limited to the specific terms used.

A method and apparatus are disclosed herein to detect the switching point from DL to UL and from UL to DL in a TDD wireless communication system with reduced complexity receiver which may not require decoding the system information broadcast by the base station.

Figure 3:
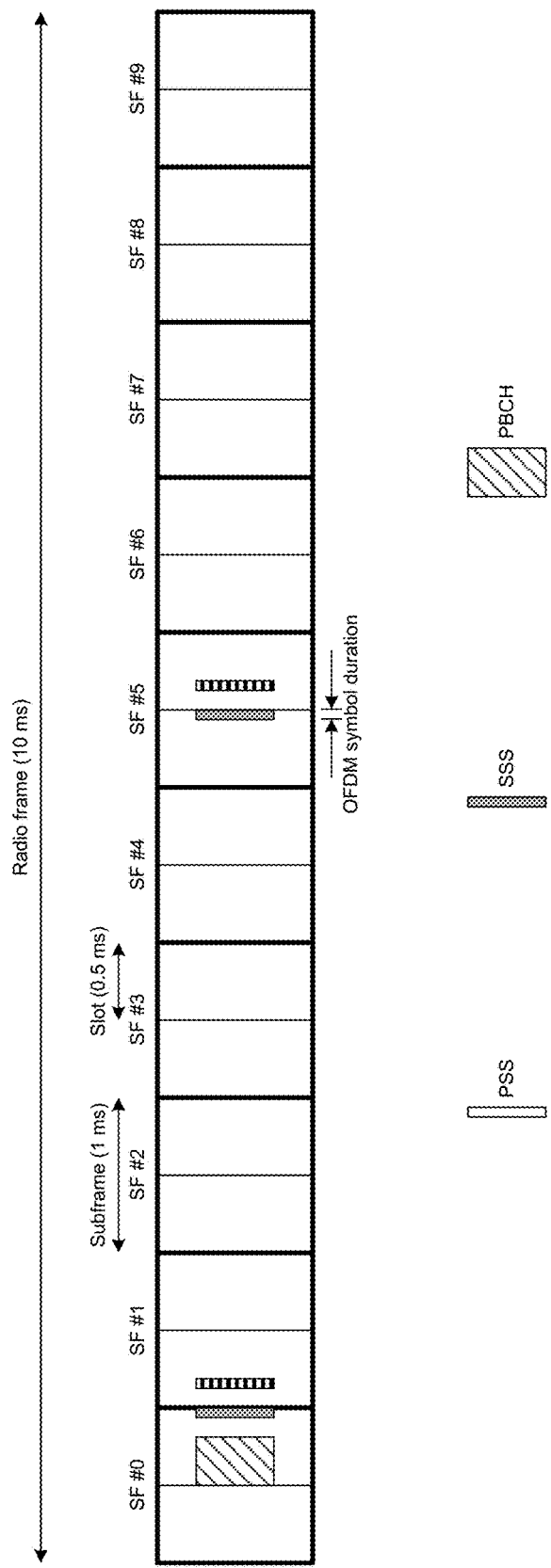
FIG. 3 illustrates the air interface structure of a 3rd Generation Partnership Project (3GPP) Long-Term Evolution (LTE) TDD based wireless communication system.
Figure 4:
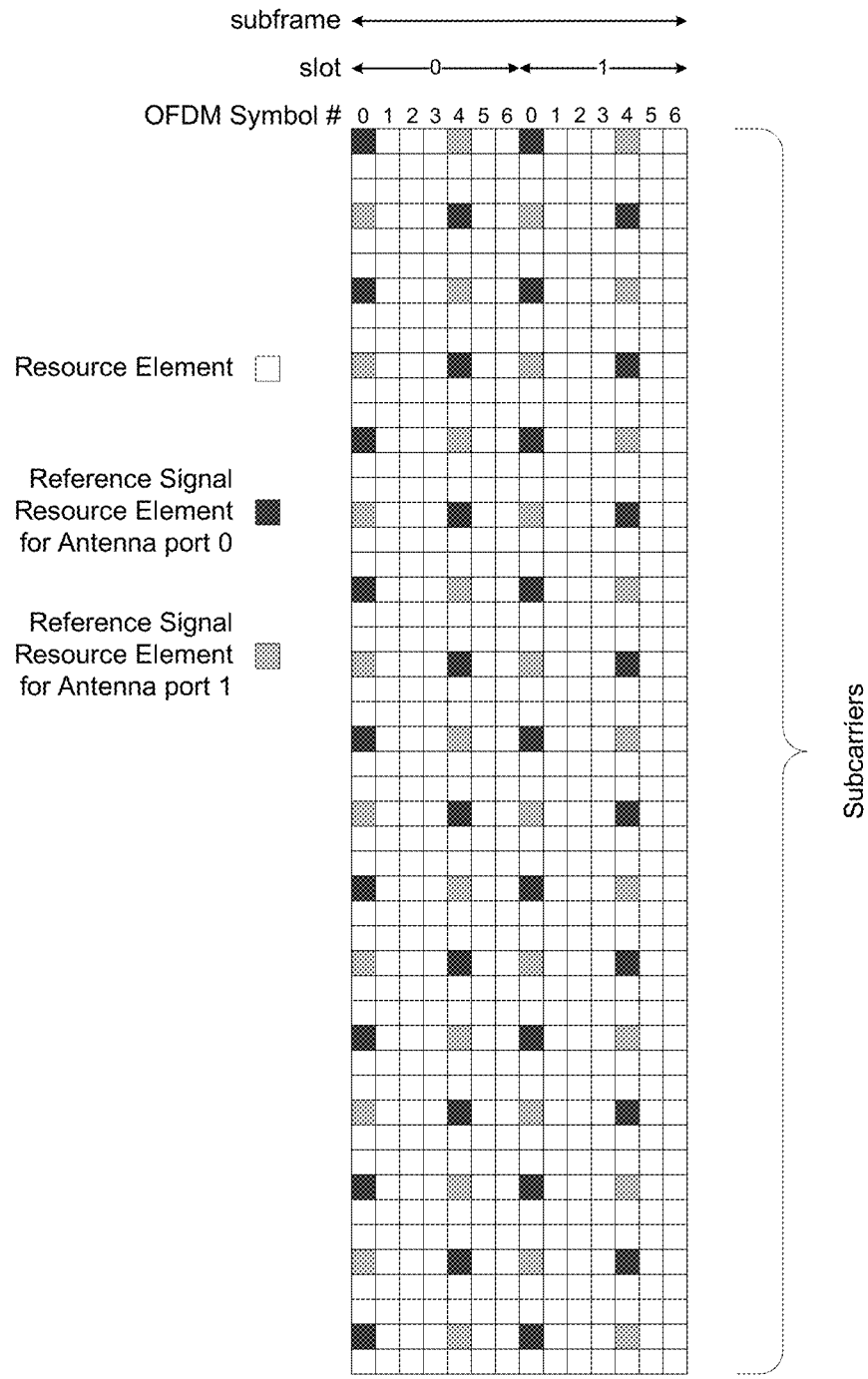
FIG. 4 illustrates the detailed structure of a 3GPP LTE subframe comprising OFDM symbols and subcarriers.

The 3GPP LTE TDD wireless communication system is considered for illustrating the aspects of the present invention. The 3GPP LTE wireless communication system is based on Orthogonal Frequency Division Multiplexing (OFDM) technique. The air interface structure of the 3GPP LTE wireless communication system for TDD is shown in FIG. 3. It is organized into frames, subframes, and slots as shown in FIG. 3. A further detailed view of a subframe is shown in FIG. 4 where each subframe comprises two slots and a number of OFDM symbols which in turn comprise a number of subcarriers. One subcarrier for the duration of one OFDM symbol is referred to herein as a Resource Element (RE). Some of the REs may be used for providing a reference for demodulation at the receiver. The REs used for this purpose are called Reference Signal (RS) REs. The exact location of RS REs and the modulation information for those REs may be known a priori based on the 3GPP LTE specifications. If a base station is using multiple DL transmit antennas, it may send different RS for each antenna. FIG. 4 shows RS REs for two different antennas for the case of a base station transmitting on two antennas. In 3GPP LTE wireless communication system, the term "antenna port" is used to refer to an antenna. At least one antenna port is always present and therefore in OFDM symbols that have RS REs, the RS REs are always present for the first antenna port. Presence of RS REs for an additional antenna port(s) may depend on whether an additional antenna(s) is being used by a base station.

Figure 5:
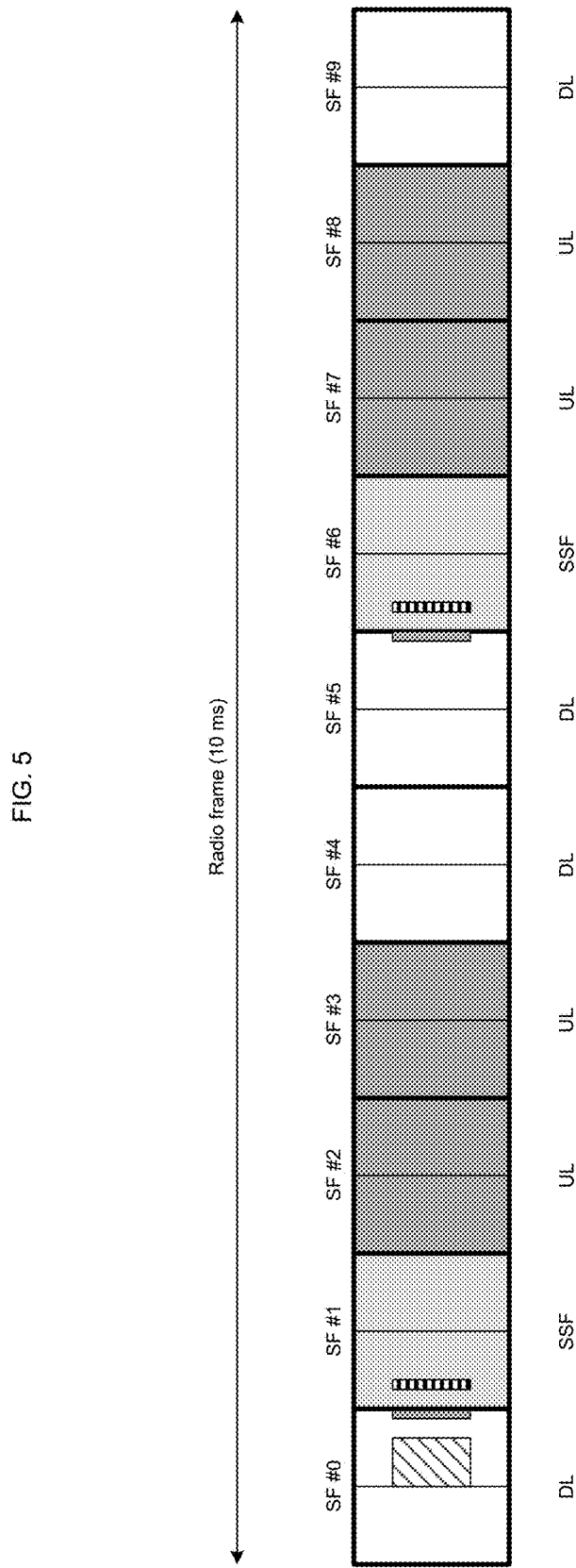
FIG. 5 illustrates the frame structure of 3GPP LTE TDD based wireless communication system with two different DL and UL durations in a frame.

In case of an FDD 3GPP LTE wireless communication system, all the subframes in a frame are DL subframes. In case of TDD 3GPP LTE wireless communication system, some subframes are DL, some are UL, and one or two subframes are Special Subframes (SSF). The specific arrangement of DL, UL and SSF subframes depends on the particular TDD configuration being used. An example TDD configuration is shown in FIG. 5 and all the possible TDD configurations are listed in the table contained in FIG. 6.

Figure 7:
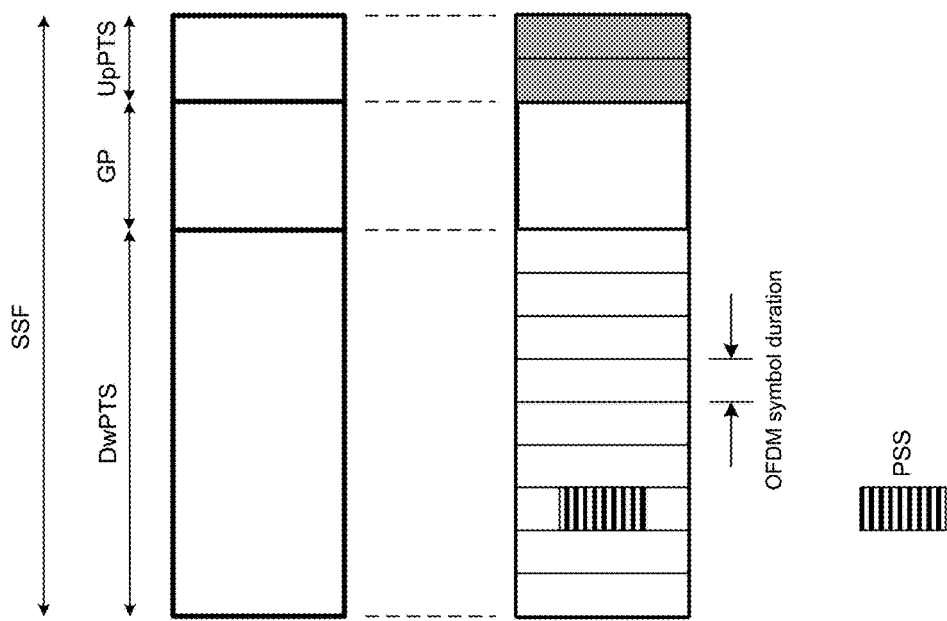
FIG. 7 illustrates the detailed structure of a 3GPP LTE special subframe comprising DL part (DwPTS), Guard part (GP), and UL part (UpPTS).

The structure of the SSF is further specified by the SSF configuration. An example SSF configuration is shown in FIG. 7. As shown in FIG. 7, the SSF comprises DL part (DwPTS), UL part (UpPTS), and a Guard part (GP). The exact duration of each of these three parts depends on the specific SSF configuration being used. The table contained in FIG. 8 lists all the possible SSF configurations. The purpose of the GP is to allow a client terminal to be able to switch from receive mode (DL) to transmit mode (UL). There is no need for explicit guard period to switch from UL to DL because the client terminal may be using timing advance for the UL and its timing may be already well ahead of the DL timing. To handle the case when the timing advance may be small, the UL transmission may always be advanced by a small fixed amount such as 20 μs to ensure there is enough time for the client terminal to switch from transmit mode to receive mode.

In 3GPP LTE wireless communication system, a client terminal normally synchronizes with the air interface by detecting the Primary Synchronization Signal (PSS) and Secondary Synchronization Signal (SSS). The PSS and SSS together provide the OFDM symbol, subframe and frame timing synchronization. In 3GPP LTE wireless communication system, the number of DL transmit antennas used may be either 1, 2 or 4. The channel bandwidth used by the LTE wireless communication network may be either 1.4 MHz, 3 MHz, 5 MHz, 10 MHz, 15 MHz or 20 MHz. The number of DL transmit antenna ports, the exact channel bandwidth, and other critical information about the cell are broadcast in the Physical Broadcast Channel (PBCH) in subframe 0 as shown in FIG. 3. The PBCH is transmitted using convolutional encoding and Quadrature Phase Shift Keying (QPSK) modulation. Decoding the PBCH requires complex receiver implementation including channel estimation, equalization, and different decoders depending on the number DL transmit antenna ports used. Although the channel bandwidth used by a cell may vary, the PSS, SSS and PBCH are always transmitted in the lowest supported channel bandwidth of 1.4 MHz within the actual channel bandwidth used by the cell.

Figure 9A:
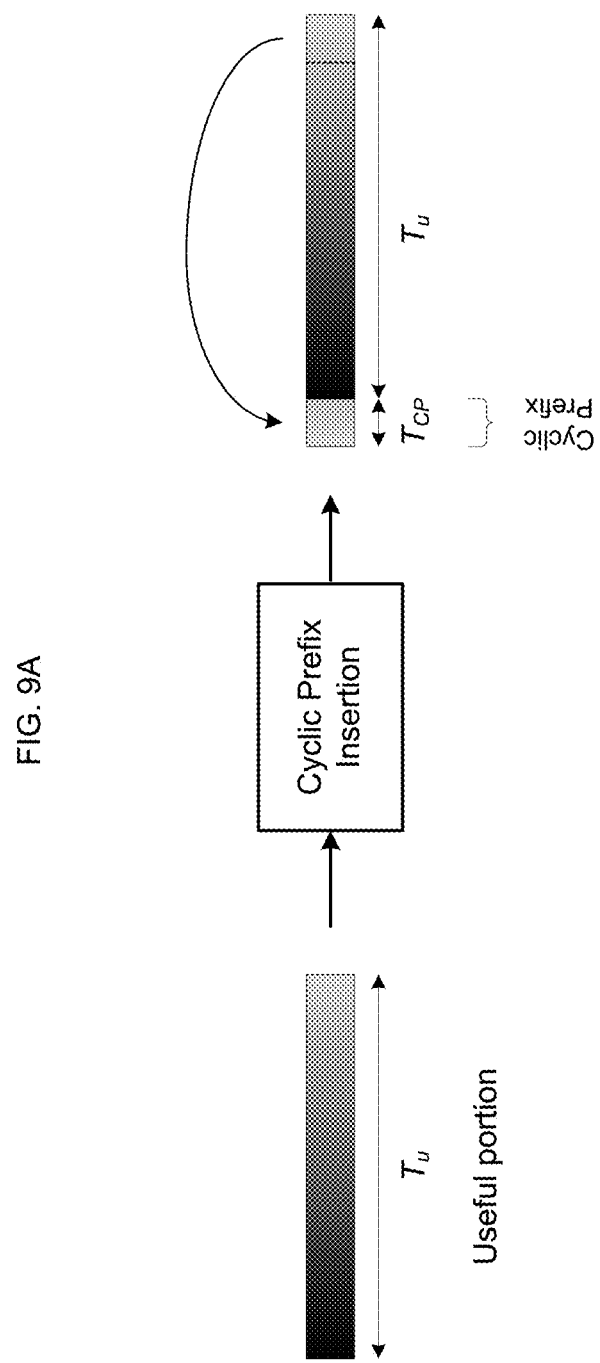
FIG. 9A illustrates the insertion of a Cyclic Prefix (CP) in an OFDM symbol.

An OFDM symbol consists of a useful signal and a Cyclic Prefix (CP). The CP is the tail portion of the useful signal placed at the beginning of the useful signal of an OFDM symbol as shown in FIG. 9A. The CP may be used in all OFDM symbols in both DL and UL. The correlation between CP and tail portion of the OFDM symbol, as shown in FIG. 9B, may be used to determine an OFDM symbol boundary as well as the presence of a valid OFDM symbol.

If there is a strong CP correlation, then a valid OFDM symbol may be present and its boundary may be tracked based on the CP correlation peak position. The 3GPP LTE wireless communication system supports use of one of the two different CP durations called Normal CP (NCP) and Extended CP (ECP). The length of the CP in terms of number of samples varies depending on the actual channel bandwidth used by the cell, i.e., the number of samples in CP portion for NCP may be different for each bandwidth even though the time duration of the NCP is the same for all supported channel bandwidths. For a given channel bandwidth the length of the NCP and ECP are different in terms of time duration as well as in number of samples.

According to an aspect of the present invention, a Signal Enhancer only detects the PSS and SSS of a cell to achieve synchronization with a cell. A Signal Enhancer may be able to detect PSS and SSS without a priori knowledge about the number of DL transmit antenna ports used. As part of PSS and SSS detection, the Signal Enhancer also determines whether NCP or ECP is being used in the cell. This determination may be done based on the different position of SSS relative to PSS as a function of the CP type. According to an aspect of the present invention, a Signal enhancer may determine the channel bandwidth used in a cell without decoding the PBCH and only by performing CP correlation. According to an aspect of the present invention, a Signal Enhancer samples the channel with the sampling rate corresponding to the highest supported channel bandwidth, for example 30.72 Msps for 20 MHz channel. According to another aspect of the invention, the Signal Enhancer may perform CP correlation corresponding to the detected CP type with the length corresponding to all supported channel bandwidths. According to another aspect of the present invention, the Signal Enhancer combines the CP correlations over a configurable duration to enhance the reliability of the computed correlations. For example, the combining duration may be five frames.

Figure 9B:
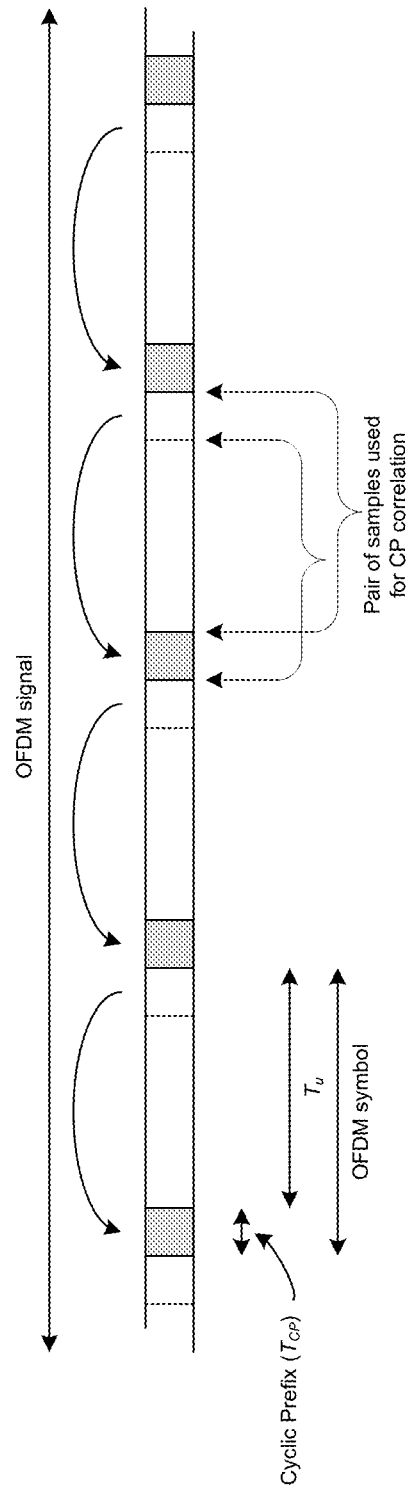
FIG. 9B illustrates an OFDM signal comprising a sequence of OFDM symbols and the pairs of samples used for CP correlation of an OFDM symbol.

Referring to FIG. 9B, in one embodiment the combining of the CP correlations may be performed as follows. An OFDM signal consists of a sequence of one or more OFDM symbols. A CP correlation involves a product of a sample from the CP portion and the complex conjugate of the sample in the tail portion of an OFDM symbol separated by duration $T_u$ as shown in FIG. 9B. Such CP correlation is performed over the CP duration worth of samples for each OFDM symbol and the CP correlation from each sample pair is accumulated to produce a single accumulated CP correlation per OFDM symbol referred herein as $C_{symb}$. The accumulated CP correlation for each OFDM symbol, $C_{symb}$, is further accumulated over similar CP correlations computed for each OFDM symbol. The accumulation of CP correlation of each OFDM symbol, $C_{symb}$, over a given duration, such as 100 OFDM symbols, is referred to herein as combining CP correlation, which obtains a combined CP correlation referred to herein as $C_{comb}$. Mathematically, for an OFDM symbol m $$C_{symb}(m) = \sum_{k=0}^{N_{CP}-1} x(k) x^*(k+N) \quad (1)$$

where x( ) is the incoming sample sequence, x*( ) is the complex conjugate of x( ), $N_{CP}$ is the length of the CP portion and N is the length of the useful portion of an OFDM symbol in terms of samples. For a sampling rate of $f_s$, $T_{CP}=N_{CP}/f_s$ and $T_U=N/f_s$, the combined CP correlation is given by $$C_{comb} = \sum_{m=0}^{M-1} C_{symb}(m) \quad (2)$$

where M is the number of OFDM symbols over which the combining is performed. In an alternative embodiment, the combined CP correlation may be computed by accumulating the absolute value of the OFDM symbol CP correlation as follows:

$$C_{comb} = \sum_{m=0}^{M-1} |C_{symb}(m)| \quad (3)$$

where the notation |•| indicates absolute value.

According to another aspect of the present invention, the Signal Enhancer only combines the CP correlations corresponding to the OFDM symbols that may be known to be DL OFDM symbols regardless of the TDD configuration being used. Specifically, the CP correlation may be performed and combined over all the OFDM symbols of subframes 0 and 5 which are known to be DL subframes as per the table of FIG. 6. The first three OFDM symbols of subframes 1 and 6 are also known to be DL OFDM symbols as per the table contained in FIG. 8 in which the DwPTS is at minimum three OFDM symbols long. According to another aspect of the invention, the Signal Enhancer normalizes the CP correlation using the total power computed over the same exact samples used for CP correlation over the same exact OFDM symbols. For example, in one embodiment the normalized CP correlation $C_{norm}$ may be computed as follows:

$$C_{norm} = \frac{|C_{comb}|}{P} \quad (5)$$

where P is the average power computed over the samples used for CP correlation and computed as follows:

$$P = \sum_{m=0}^{M-1} P_{symb}(m) \quad (6)$$

where, $$P_{symb}(m) = \frac{1}{2} \sum_{k=0}^{N_{CP}-1} x(k)x^*(k) + x(k+N)x^*(k+N) \quad (7)$$

According to another aspect of the invention, the Signal Enhancer compares the normalized combined CP correlations corresponding to all supported channel bandwidths and selects the channel bandwidth corresponding to the highest normalized combined CP correlation as the channel bandwidth being used in the cell. The Signal Enhancer already knows the expected location of the CP correlation peaks since it knows the OFDM symbol start position and the length of the OFDM symbol based on PSS, SSS and CP type detection. Therefore, it may be able to narrow the search for a CP correlation peak over a small range.

Figure 10:
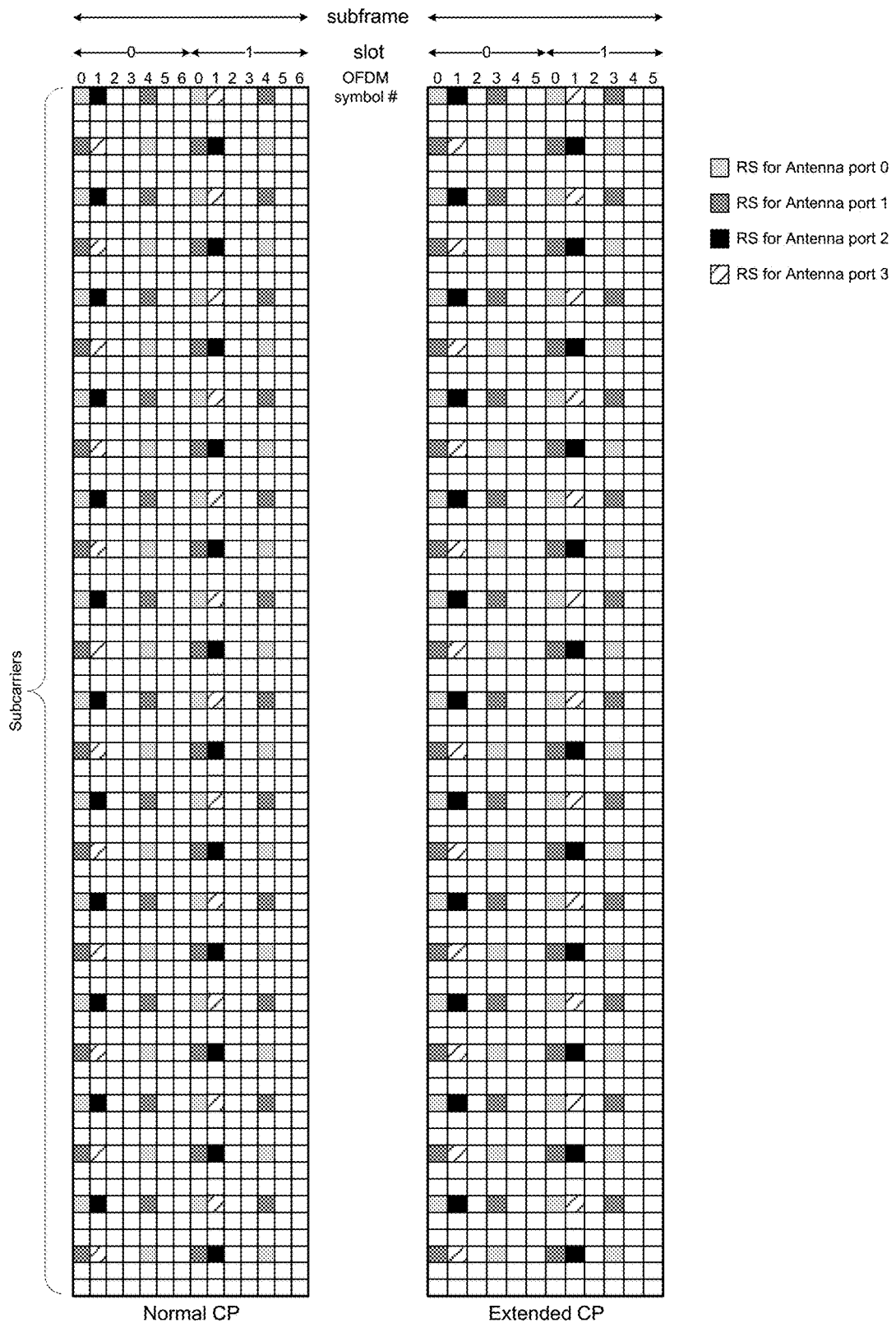
FIG. 10 illustrates the location of a Reference Signal in a subframe for different antenna ports configuration when Normal or Extended CP is used.

A 3GPP LTE wireless communication system broadcasts cell specific Reference Signals (RS) in all the DL subframes and SSF to enable coherent reception. The number of RS, their mapping to different OFDM symbols and subcarriers is specified in the 3GPP LTE wireless communication system specifications. The location of the RS for different DL transmit antenna ports may be different as shown in FIG. 10, which identifies the OFDM symbols in which the RS may be present for a particular antenna port. The location of RS REs within each OFDM symbol is illustrated in FIG. 4.

According to another aspect of the present invention, after determining the channel bandwidth being used, the Signal Enhancer samples a channel of the cell at the sampling rate corresponding to the channel bandwidth determined in previous step. Next, the Signal Enhancer performs Fast Fourier Transform (FFT) operation to convert the time domain OFDM symbol into a frequency domain. This operation may be done only for OFDM symbols that may have the RS included in them as per the 3GPP LTE wireless communication system specifications. According to an aspect of the present invention, using the frequency domain OFDM symbol, the Signal Enhancer estimates the RS Received Power (RSRP) for each possible antenna port that may possibly be used by the base station. The RSRP may be estimated by computing the average power over all the RS REs in a given OFDM symbol. According to another aspect of the invention, the Signal Enhancer averages the RSRP computed over a configurable number of OFDM symbols to improve the reliability of the measured RSRP. For example, the RSRP measurement may be averaged over 100 OFDM symbols that may have RS REs. In one embodiment, the RSRP of an OFDM symbol m may be estimated by $$RSRP_{symb}(m) = \frac{1}{N_{RS}} \sum_{p \in P} y_m(p) y_m^*(p) \qquad (8)$$

where $y_m$ is the frequency domain OFDM symbol number m with the demodulated RS REs, y*( ) is the complex conjugate of y( ), and P is the set of all the RE indices within an OFDM symbol that are RS REs and $N_{RS}$ is the total number of RS REs in one OFDM symbol. The symbol RSRP may be estimated over a predetermined number of OFDM symbols and averaged as follows:

$$RSRP_{avg} = \frac{1}{M} \sum_{m=0}^{M-1} RSRP(m) \qquad (9)$$

to estimate the average RSRP. According to another aspect of the present invention, the Signal Enhancer determines the presence or absence of the RS signals on the additional possible antenna ports (1, 2 or 4). According to another aspect of the invention, the first antenna port average RSRP may be used as a reference power level to determine whether the RS are present for the other transmit antenna ports. A configurable threshold may be used to specify the fraction of the first antenna port average RSRP required as minimum RSRP on other ports to consider those antenna ports to be present. Based on the RSRP measurements and the comparison against the threshold, a determination is made about the number of antenna ports present in the cell.

According to another aspect of the present invention, after detecting the number of DL transmit (TX) antenna ports the Signal Enhancer performs CP correlation on all the OFDM symbols in a frame except for the subframes that are known to be always UL subframes regardless of the TDD configuration. Specifically, subframe 1 is always a UL subframe and it is not used for CP correlation. According to another aspect of the invention, the CP correlation for each OFDM symbol in each subframe is separately combined and normalized over a configurable number of frames to increase the reliability of the correlations. In one embodiment, referring to Equation (2) as set forth above, the number of OFDM symbols used for combining CP correlations is restricted to the OFDM symbols belonging to the same subframe. Referring to FIG. 5, the combined CP correlation for subframe #0 is computed by combining the symbol CP correlation for OFDM symbols only belonging to that subframe. Similarly, the combined CP correlation for other subframes is computed by combining the symbol CP correlation for OFDM symbols only belonging to those respective subframes. Further, the normalizing may be performed similarly as described above in connection with Equations (4)-(6), where the number of OFDM symbols used for computing the average power is restricted to the OFDM symbols belonging to the same subframe. Specifically the same OFDM symbols used for CP correlation combining are used for computing the average power. According to another aspect of the present invention, the OFDM symbols for which the normalized correlations exceed a configurable threshold may be considered as valid DL OFDM symbols. The configurable threshold may be specified as a fraction of the normalized CP correlation for the OFDM symbols that are known to be DL OFDM symbols with RS REs as per FIG. 10 and the tables contained in FIG. 6 and FIG. 8. After the determination is made about whether an OFDM symbol is a DL symbol or not, a determination is made about the particular TDD configuration being used by a cell. This determination is made by computing the differences between the expected DL OFDM symbols with RS for each possible TDD configuration and the detected DL OFDM symbols with RS. The comparison may be made only between the OFDM symbols that contain the RS. According to another aspect of the invention, the OFDM symbols that contain RS may be determined according to the detected number of DL transmit antenna ports used by the base station.

According to another aspect of the present invention, the Signal Enhancer determines the length of the DwPTS as follows. The Signal Enhancer computes the CP correlation over the maximum possible number of DL OFDM symbols in DwPTS in an SSF. Specifically, the maximum possible number of OFDM symbols in DwPTS is 12 and 10 for NCP and ECP respectively based on the table contained in FIG. 8. The CP correlation is performed over a configurable number of SSFs and the CP correlation is combined and normalized separately for each OFDM symbol. According to an aspect of the present invention, the normalized combined CP correlation of the first OFDM symbol in a SSF which contains a RS is used as a reference to determine the number of valid DL OFDM symbols present in the SSF. The normalized combined CP correlations of all the OFDM symbols in the SSF are compared against the normalized combined CP correlation of the first OFDM symbol scaled by a configurable threshold. If the normalized combined CP correlation of an OFDM symbol exceeds the normalized combined CP correlation of the first OFDM symbol scaled by the configurable threshold then it may be considered as a valid DL OFDM symbol. After determining the valid DL OFDM symbols in the SSF, the detected DL OFDM symbols profile may be compared against the possible DL OFDM symbols (DwPTS) as per the 3GPP LTE wireless communication system specification as shown in FIG. 8. According to another aspect of the present invention, the SSF configuration whose DwPTS is closest to the detected DL OFDM symbols profile in the SSF may be used as the one used by the base station.

According to the aspects of the present invention the Signal Enhancer may be able to determine the cell identity, the channel bandwidth, the CP type, the number of DL transmit antenna ports being used, the TDD configuration, and the SSF configuration with very limited processing. Based on this information, the Signal Enhancer may start the actual signal enhancement operation in the DL mode, i.e., receive signal from the base station in DL and transmit the boosted signal toward the client terminal. According to another aspect of the invention, the Signal Enhancer switches to the UL mode, i.e., receives a signal from the client terminal and transmits a boosted signal towards the base station at the known timing of UL subframes according to the detected TDD configuration and SSF configuration.

According to another aspect of the present invention, the Signal Enhancer may store the information about the detected cell with its cell identity and related parameters. The Signal Enhancer may use the stored information in case it needs to reacquire the information about a cell with the same identity. According to another aspect of the invention, the Signal Enhancer may use configurable timers to age the stored information such that, after the configured timer for a cell expires, the stored information may be discarded. In some cases a Signal Enhancer may be located near a boundary between two or more cells. In such cases the Signal Enhancer may frequently switch back and forth between two or more cells if it attempts to camp on the strongest cell. According to an aspect of the present invention, the Signal Enhancer may use hysteresis to minimize frequent switching between two or more cells. According to this aspect, a Signal Enhancer may switch to a neighbor cell only if its signal is stronger than its current serving cell by a configurable amount. According to another aspect of the invention, the Signal Enhancer may use other metrics for cell reselection such as Signal to Noise and Interference Ratio (SINR), RSRP, RS Received Quality (RSRQ), etc. According to another aspect of the invention, a Signal Enhancer may use configurable timers to minimize frequent switching between two or more cells. According to this aspect, a Signal Enhancer may switch to a neighbor cell only if it has not camped on that cell at least for a configurable amount of time.

Figure 11:
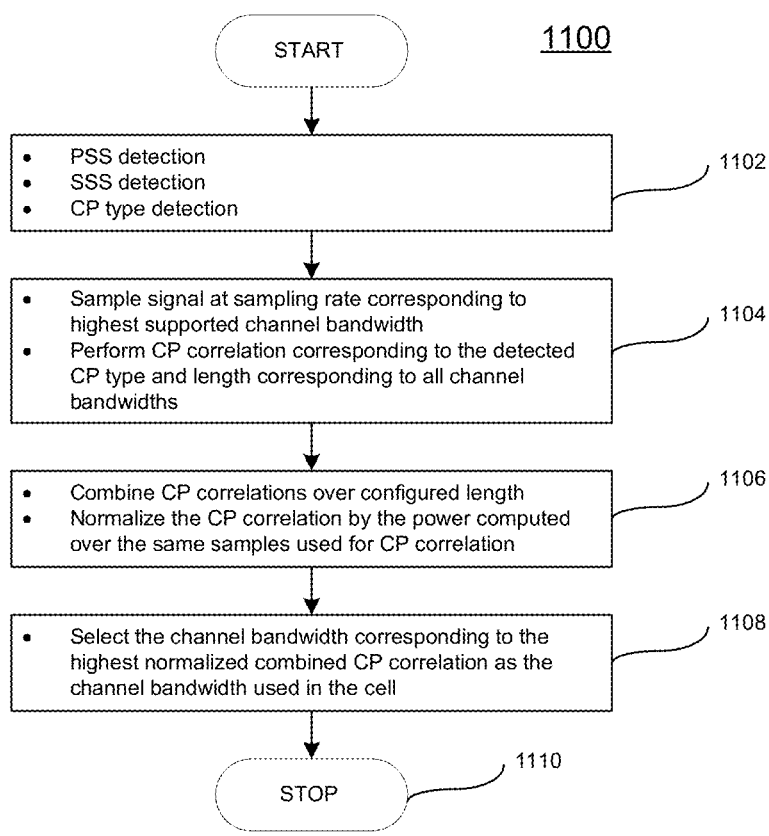
FIG. 11 illustrates the flow diagram for the processing steps for channel bandwidth determination according to aspects of the present invention.

The flow diagram 1100 contained in FIG. 11 illustrates the bandwidth determination part of the Signal Enhancer operating according to the aspects of the present invention. The processing relevant to the present invention begins in processing stage 1102, where the PSS detection, SSS detection and CP type detection is performed. At the end of this processing, the cell identity and the CP type are determined based on the PSS and SSS detection. At processing stage 1104, CP correlation corresponding to the CP type detected in previous step is performed over configured length (number of OFDM symbols) for different CP lengths corresponding to all supported channel bandwidths. The sampling rate of the incoming signal corresponds to the one required for the highest channel bandwidth. At processing stage 1106, the CP correlations are combined over the configured length (number of OFDM symbols) and normalized with the computed power of the CP samples. At processing stage 1108, the highest normalized combined CP correlation is determined from all the normalized CP correlations corresponding to different channel bandwidth that may be supported by a cell. The channel bandwidth corresponding to the highest normalized combined CP correlation is determined to be the channel bandwidth used by the cell. The maximum possible value of the normalized combined CP correlation is one. The processing for channel bandwidth determination then terminates at stage 1110.

Figure 12:
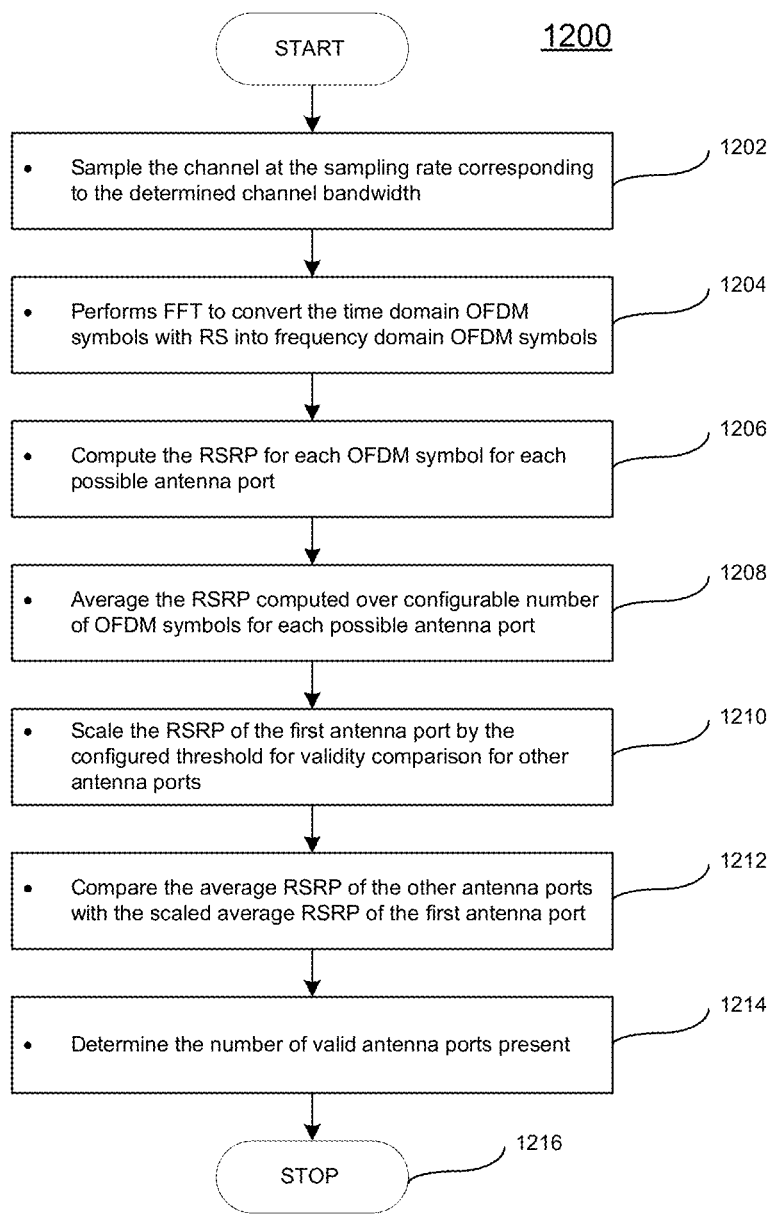
FIG. 12 illustrates the flow diagram for the processing steps for number of antenna ports determination according to aspects of the present invention.

The flow diagram 1200 contained in FIG. 12 illustrates the number of antenna ports determination part of the Signal Enhancer operating according to the aspects of the present invention. The processing relevant to the present invention begins in processing stage 1202, where a channel of the base station is sampled according to the sampling rate required for the channel bandwidth determined in earlier steps. For example, if the channel bandwidth is determined to be 10 MHz, the sampling rate may be 15.36 Msps. At processing stage 1204, an FFT is performed for the incoming time domain OFDM symbols that may contain the RS to convert it into a frequency domain OFDM symbol. At processing stage 1206, the RSRP is computed for each possible antenna port according to 3GPP LTE wireless communication system specifications. At processing stage 1208, the RSRP computed over the configured number of OFDM symbols is averaged for improved reliability of measurements. At processing stage 1210, the average RSRP of the first antenna port, which may be always present, is scaled by a configured threshold. The scaled average RSRP of the first antenna port is used as a minimum RSRP value for other antenna ports to consider them as valid antenna ports that may be present in a cell. At processing stage 1212, the average RSRP of antenna ports other than the first port is compared against the scaled average RSRP of the first antenna port. At processing stage 1214, a determination is made about the actual number of valid antenna ports present in the current cell. The processing for the number of antenna ports determination part then terminates at stage 1216.

Figure 13:
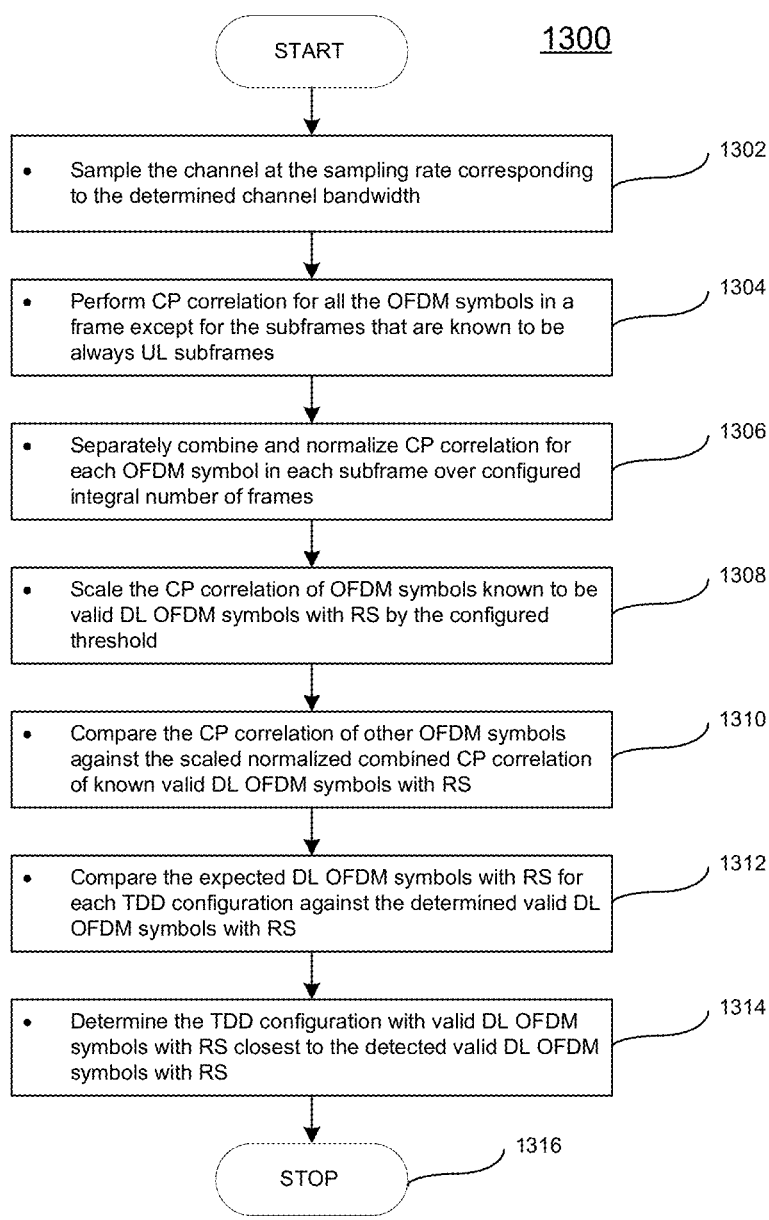
FIG. 13 illustrates the flow diagram for the processing steps for TDD configuration determination according to aspects of the present invention.

The flow diagram 1300 contained in FIG. 13 illustrates the TDD configuration determination part of the Signal Enhancer operating according to the aspects of the present invention. The processing relevant to the present invention begins in processing stage 1302, where the channel is sampled according to the sampling rate required for the channel bandwidth determined in earlier steps. At processing stage 1304, the CP correlation is performed for all OFDM symbols in a frame except for the subframes that are known to be always UL subframes. At processing stage 1306, the CP correlation for each OFDM symbol in a frame determined in step 1304 is separately combined over a configured duration and normalized. The combining may be performed over integral number of frames to ensure that the same number of CP correlations is combined for each OFDM symbol in a frame. At processing stage 1308, the CP correlation of OFDM symbols that are known to be valid DL OFDM symbols, such as the RS symbols in subframe 0 and subframe 5, is scaled by the configured threshold. At processing stage 1310, the normalized combined CP correlations for other OFDM symbols in a frame are compared to check whether they exceed the scaled normalized combined CP correlation of known valid DL OFDM symbols with RS. At processing stage 1312, the determined valid DL OFDM symbols are compared against the expected valid DL OFDM symbols in each subframe for each possible TDD configuration according to the table contained in FIG. 6. Additionally, the comparisons may be made only for the OFDM symbols within a subframe that may contain RS as shown in FIG. 10. At processing stage 1314, the TDD configuration with valid DL OFDM symbols closest to the measured valid DL OFDM symbols is determined to be TDD configuration being used by the current cell. The processing for the TDD configuration determination part then terminates at stage 1316.

Figure 14:
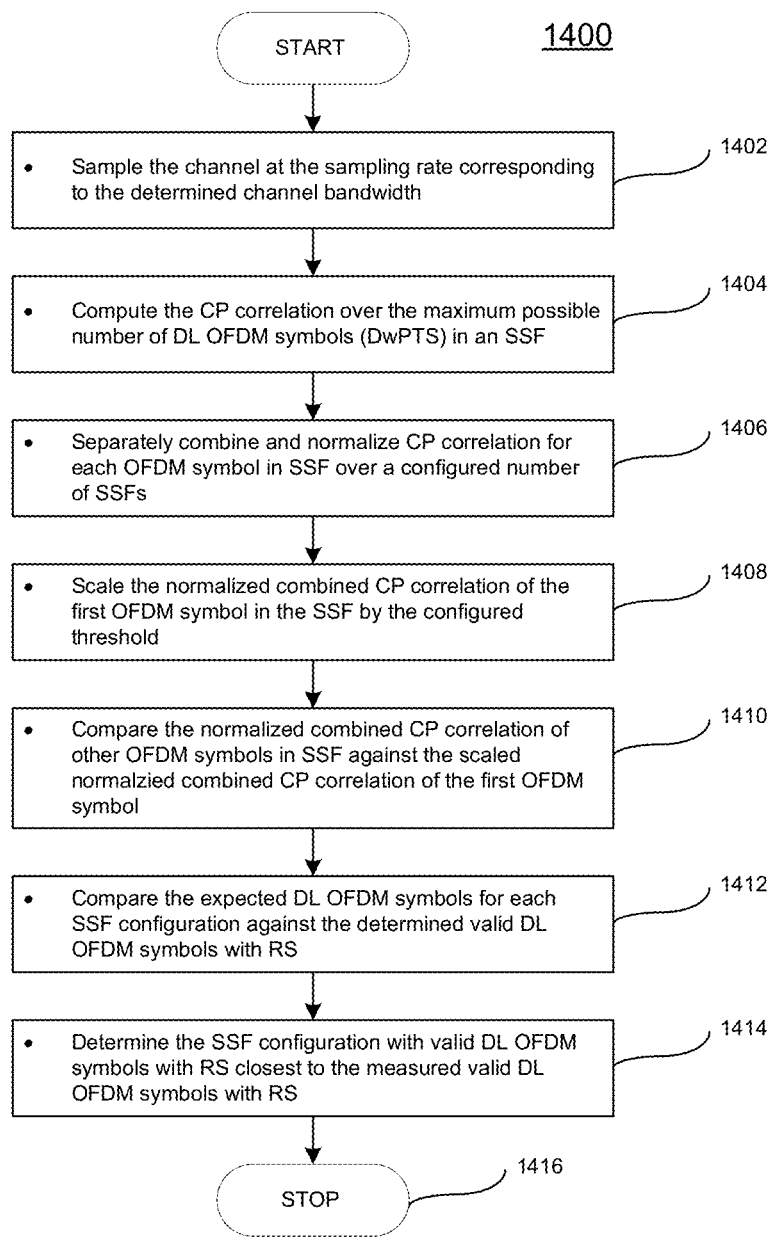
FIG. 14 illustrates the flow diagram for the processing steps for Special Subframes (SSF) configuration determination according to aspects of the present invention.

The flow diagram 1400 contained in FIG. 14 illustrates the SSF configuration determination part of the Signal Enhancer operating according to the aspects of the present invention. The processing relevant to the present invention begins in processing stage 1402, where the channel is sampled according to the sampling rate required for the channel bandwidth determined in earlier steps. At processing stage 1404, the CP correlation is performed over the maximum possible number of DL OFDM symbols based on DwPTS duration as per the table contained in FIG. 8. At processing stage 1406, the CP correlation for each OFDM symbol in the SSF is combined over a configured number of SSFs and normalized. At processing stage 1408, the CP correlation of the first OFDM symbol in an SSF, which is known to be valid DL OFDM symbol with RS, is scaled by the configured threshold. At processing stage 1410, the normalized combined CP correlations for other OFDM symbols in an SSF are compared to check whether they exceed the scaled normalized combined CP correlation of the first DL OFDM symbol. At processing stage 1412, the determined valid DL OFDM symbols are compared against the expected valid DL OFDM symbols for each possible SSF configuration according to the table contained in FIG. 8. At processing stage 1414, the SSF configuration with valid DL OFDM symbols closest to the measured valid DL OFDM symbols is determined to be TDD configuration being used by the current cell. The processing for the TDD configuration determination part then terminates at stage 1416.

Figure 15:
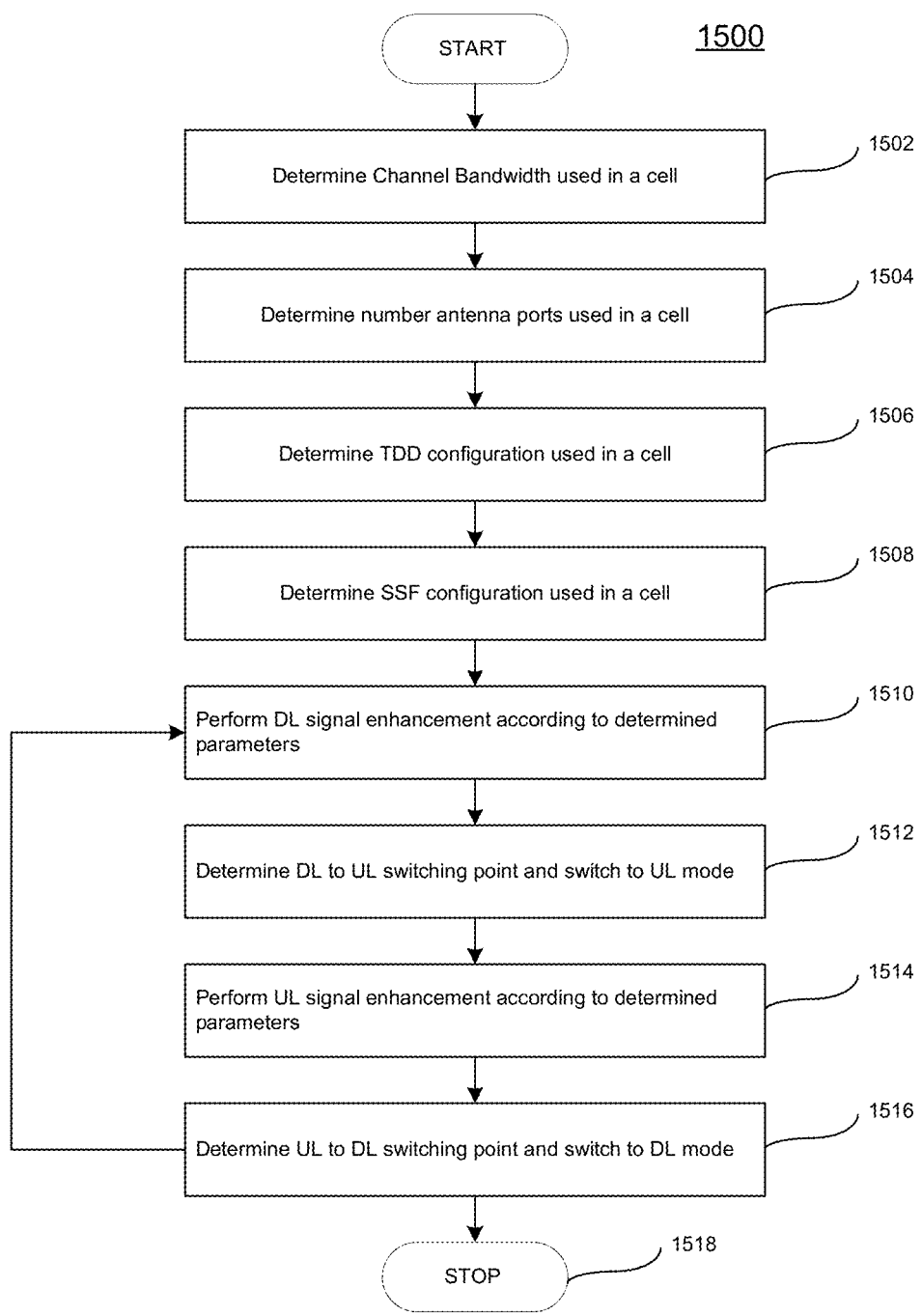
FIG. 15 illustrates the flow diagram for the processing steps Signal Enhancer operation according to aspects of the present invention.

The flow diagram 1500 contained in FIG. 15 illustrates the overall operation of the Signal Enhancer according to the aspects of the present invention. At processing stage 1502, the Signal Enhancer determines the channel bandwidth used in a cell according to the flow diagram 1100 contained in FIG. 11. At processing stage 1504, the Signal Enhancer determines the number of antenna ports used in a cell according to the flow diagram 1200 contained in FIG. 12. At processing stage 1506, the Signal Enhancer determines the TDD configuration used in a cell according to the flow diagram 1300 contained in FIG. 13. At processing stage 1508, the Signal Enhancer determines the SSF configuration used in a cell according to the flow diagram 1400 contained in FIG. 14. At processing stage 1510, Signal Enhancer begins the DL signal enhancement operation according to the aspect of the present invention. At processing stage 1512, the Signal Enhancer monitors the timing and switches to the UL mode when the DL to UL switch point is reached according to the determined parameters. At processing stage 1514, the Signal Enhancer begins the UL signal enhancement operation according to the aspect of the present invention. At processing stage 1516, the Signal Enhancer monitors the timing and switches to the DL mode when the UL to DL switch point is reached according to the determined parameters. The processing returns to the processing stage 1510. The Signal Enhancer processing may terminate at stage 1518.

Figure 16:
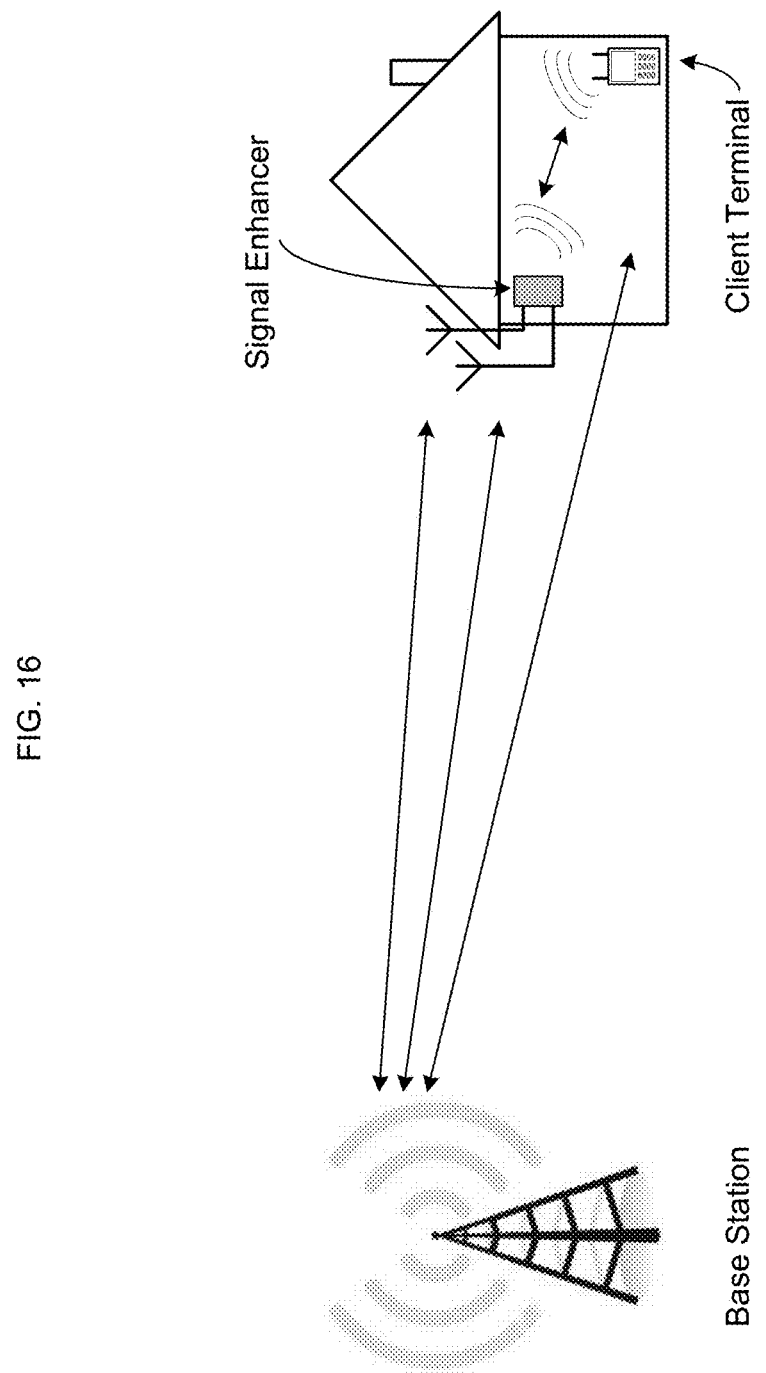
FIG. 16 illustrates a diagram of a use case of a Signal Enhancer with aspects of the present invention.

By way of example only, the above-described method may be implemented in a Signal Enhancer of the wireless communication system as shown in FIG. 16.

Figure 17:
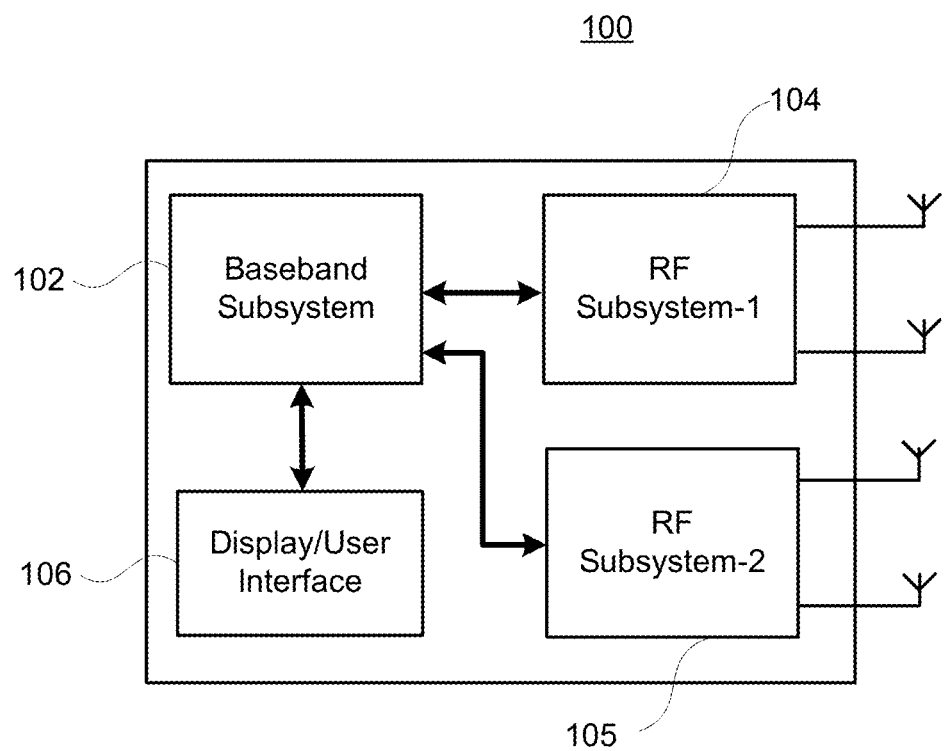
FIG. 17 illustrates a diagram of a Signal Enhancer in a wireless communication system for use with aspects of the present invention.

As shown in FIG. 17, the Signal Enhancer 100 may include a baseband subsystem 102 and radio frequency (RF) subsystems 104 and 105 for use with a wireless communication network. A display/user interface 106 provides information about network. By way of example, the user interface may include one or more signal level indicators.

Figure 18:
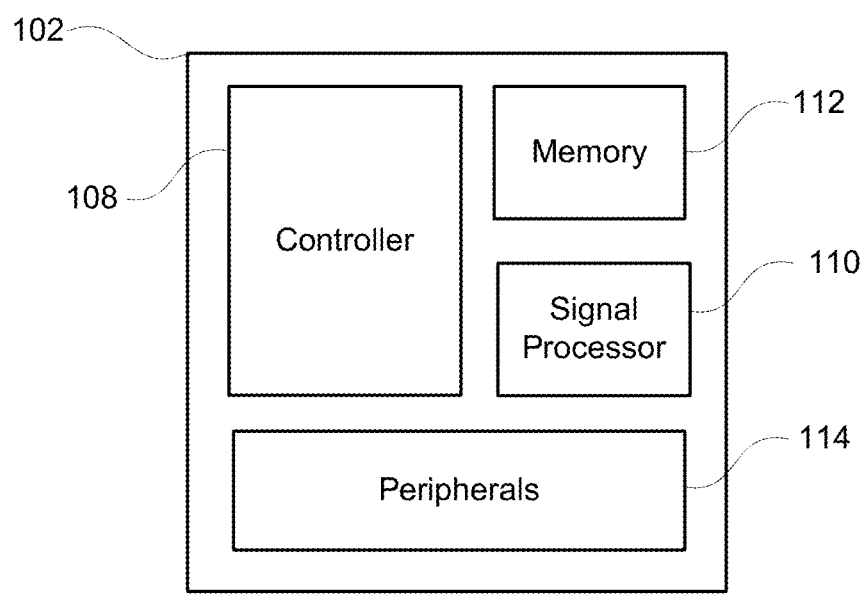
FIG. 18 illustrates a baseband subsystem for use with aspects of the present invention.

The baseband subsystem 102 as shown in FIG. 18 may include a controller 108 such as a microcontroller or other processor. The controller 108 desirably handles overall operation of the Signal Enhancer 100, including management of the RF subsystems 104 and 105. This may be done by software or firmware running on the controller 108. Such software/firmware may embody any methods in accordance with aspects of the present invention.

A signal processor 110 may be used to process samples from the RF subsystems 104 and 105 or other information sent or received by the Signal Enhancer 100. The signal processor 110 may be a stand-alone component or may be part of the controller 108. Memory 112 may be shared by or reserved solely for one or both of the controller 108 and the signal processor 110. For instance, signal-processing algorithms may be stored in a non-volatile section of memory 112 while coefficients and other data parameters may be stored in RAM. Peripherals 114 such as display, signal level indicators, etc. may be employed and managed through the controller 108.

The RF subsystems 104 and 105 preferably provide two-way communication operation. It may include one or more receivers/receive chains, one or more transmitter/transmit chains, a synthesizer, a power amplifier, and one or more antennas operatively coupled to enable communication. In RF subsystem 104, the receive chain(s) is operable to receive signals from one or more channels in a wireless communication network. The transmit chain(s) is operable to transmit signals in one or more channels towards a wireless communication network. In RF subsystem 105, the receive chain(s) is operable to receive signals from one or more channels used by a client terminal. The transmit chain(s) is operable to transmit signals in one or more channels to towards client terminal. Aspects of the present invention may be implemented in firmware of the signal processor 110 and/or the controller 108 of the baseband subsystem. In another alternative, aspects of the present invention may also be implemented as a combination of firmware and hardware of the baseband subsystem. It may be part of the baseband subsystem, the receiver subsystem or be associated with both subsystems. In one example, the controller 108 and/or the signal processor 110 may include or control the protocol entity circuitry. The software may reside in internal or external memory and any data may be stored in such memory. The hardware may be an application specific integrated circuit ("ASIC"), field programmable gate array ("FPGA"), discrete logic components or any combination of such devices. The terms controller and processor are used interchangeably herein While examples are provided herein with reference to the 3GPP LTE wireless communication system, aspects of the present invention may be applied to all types of wireless communication systems. Examples of such wireless communication systems include LTE-Advanced (LTE-A), IEEE 802.16e, etc.

Although the aspects of the invention herein have been described with reference to particular embodiments, it is to be understood that these embodiments are merely illustrative of the principles and applications of the aspects of the present invention. It is therefore to be understood that numerous modifications may be made to the illustrative embodiments and that other arrangements may be devised without departing from the spirit and scope of the aspects of the present invention as defined by the appended claims. Aspects of each embodiment may be employed in the other embodiments described herein.

The invention claimed is:

1. A method for determining a switching point from downlink (DL) to uplink (UL) in a Time Division Duplexing (TDD) wireless communication system, the method comprising:

controlling, by a processing device, detecting a cyclic prefix (CP) type based only on detection of a Primary Synchronization Signal (PSS) and a Secondary Synchronization Signal (SSS) of a base station;

controlling, by the processing device, determining a channel bandwidth used in the base station based on the CP type;

controlling, by the processing device, sampling a channel of the base station at a sampling rate corresponding to the channel bandwidth to obtain samples;

controlling, by the processing device, determining, from the samples, (i) each DL antenna port of the base station being used by the base station, (ii) TDD configuration of the base station, and (iii) Special Subframes (SSF) configuration of the base station; and controlling, by the processing device, determining of the switching point based on the channel bandwidth, each DL antenna port of the base station determined as being used by the base station, the TDD configuration of the base station and the SSF configuration of the base station.

2. The method of claim 1, wherein the determining the channel bandwidth includes controlling, by the processing device, determining CP correlations corresponding to the CP type.

3. The method of claim 2,
wherein the CP correlations corresponding to the CP type are determined respectively for CP lengths of all supported channel bandwidths.

4. The method of claim 3,
wherein the CP correlations respectively for the CP lengths are determined over a length of a number of Orthogonal Frequency Division Multiplexing (OFDM) symbols, and further comprising:
controlling, by the processing device, combining the CP correlations to obtain combined CP correlations respectively for the CP lengths.

5. The method of claim 4,
wherein only CP correlations of the CP correlations corresponding to the OFDM symbols which are known to be DL OFDM signals are combined in the combining the CP correlations.

6. The method of claim 4, further comprising:
controlling, by the processing device, normalizing the combined CP correlations according to the CP lengths, the length of the number of OFDM symbols and powers respectively of samples used for the CP correlations, to obtain normalized combined CP correlations respectively for the CP lengths.

7. The method of claim 6, further comprising:
controlling, by the processing device, selecting a selected channel bandwidth corresponding to a highest normalized combined CP correlation of the normalized combined CP correlations as the channel bandwidth of the base station.

8. The method of claim 1, further comprising:
controlling, by the processing device:
determining, for each possible antenna port of the base station, Reference Signal Received Power (RSRP) of only Orthogonal Frequency Division Multiplexing (OFDM) symbols of the samples which have a Reference Signal (RS);
averaging the RSRP determined for each possible antenna port of the base station to obtain an average RSRP; and
determining, from the average RSRP for each possible antenna port of the base station, whether each possible antenna port of the base station is a valid antenna port.

9. The method of claim 8, further comprising:
controlling, by the processing device, determining from the average RSRP for each possible antenna port of the base station, using a first average RSRP for a first possible antenna port of the base station as a reference, whether any of the OFDM symbols having the RS is present at each possible antenna port of the base station other than the first possible antenna port.

10. The method of claim 9,
wherein whether any of the OFDM symbols having the RS is determined to be present at the other than the first possible antenna port is based on whether the average RSRP of the other than the first possible antenna port is at least a predetermined fraction of the first average RSRP.

11. The method of claim 10,
wherein, when the average RSRP of the other than the first possible antenna port is determined to be at least the predetermined fraction of the first average RSRP, the other than the first possible antenna port is determined by the processing device to be a DL antenna port of the base station being used by the base station.

12. The method of claim 1, further comprising:
controlling, by the processing device, determining CP correlation for each OFDM symbol in a frame other than of a subframe of the frame which always is a UL subframe.

13. The method of claim 12, further comprising:
controlling, by the processing device,
separately combining and normalizing the CP correlations for each OFDM symbol in each subframe over a predetermined number of frames to obtain normalized combined CP correlations, and
determining, as a valid DL OFDM symbol, each of the OFDM symbols for which the normalized combined CP correlation exceeds a predetermined threshold.

14. The method of claim 13,
wherein the predetermined threshold is a fraction of the normalized combined CP correlation for the OFDM symbols known to be valid DL OFDM symbols with a Reference Signal (RS) in a Resource Element (RE).

15. The method of claim 13, further comprising:
controlling, by the processing device,
determining a difference between expected DL OFDM symbols with a Reference Signal (RS) for each possible TDD configuration indicated in a stored table with each DL OFDM symbol with a RS determined to be valid, and
determining, as a TDD configuration of the base station, the TDD configuration indicated in the table having the expected DL OFDM symbols with a RS closest to the DL OFDM symbols with a RS determined to be valid.

16. The method of claim 1,
wherein the SSF configuration is determined by:
determining CP correlations over a maximum possible number of DL Orthogonal Frequency Division Multiplexing (OFDM) symbols in a SSF.

17. The method of claim 16 further comprising:
controlling, by the processing device,
combining and normalizing the CP correlations separately for each of the OFDM symbols over a predetermined number of frames to obtain normalized combined CP correlations,
comparing the normalized combined CP correlations of all the OFDM symbols in the SSF with a predetermined fraction of a first normalized combined correlation of a first DL OFDM symbol in the SSF containing a Reference Signal (RS) of the DL OFDMs in the SSF, and
determining, as a valid DL OFDM symbol in SSF, each of the DL OFDM symbols in the SSF for which the normalized combined CP correlation exceeds the predetermined fraction of the first normalized combined correlation of the first DL OFDM symbol in the SSF.

18. The method of claim 17, controlling, by the processing device, determining a difference between a profile of each DL OFDM symbol in a SFF determined to be valid and expected profiles of DL OFDM symbols in SSF for each possible SSF configuration indicated in a stored table; and
controlling, by the processing device, determining, as the SSF configuration of the base station, the SSF configuration indicated in the table having the expected profile of DL OFDM symbols in the SSF closest to the profile of the DL OFDM symbols in the SSF determined to be valid.

19. The method of claim 1 further comprising:
controlling, by the processing device, storing in a memory the channel bandwidth, the CP type, each DL antenna ports of the base station determined as being used by the base station, the TDD configuration of the base station and the SSF configuration of the base station.

20. The method of claim 19, further comprising:
controlling, by the processing device, discarding at least one of the channel bandwidth, the CP type, the DL antenna ports of the base station being used by the base station, the TDD configuration of the base station or the SSF configuration of the base station from the memory based on elapsed time.

21. The method of claim 1, further comprising:
controlling, by the processing device, switching of camping on from the base station to a second base station using hysteresis.

22. The method of claim 1, further comprising:
controlling, by the processing device, switching of camping on from the base station to a second base station only when a predetermined time has elapsed since last camping on to the second base station.

23. An apparatus for determining a switching point from downlink (DL) to uplink (UL) in a Time Division Duplexing (TDD) wireless communication system, the apparatus comprising:
a processor and a memory including instructions, which when executed by the processor, control:
detecting a cyclic prefix (CP) type based only on detection of a Primary Synchronization Signal (PSS) and a Secondary Synchronization Signal (SSS) of a base station;
determining a channel bandwidth used in the base station based on the CP type;
sampling a channel of the base station at a sampling rate corresponding to the channel bandwidth to obtain samples;
determining, from the samples, (i) each DL antenna port of the base station being used by the base station, (ii) TDD configuration of the base station, and (iii) Special Subframes (SSF) configuration of the base station; and
determining of the switching point based on the channel bandwidth, each DL antenna port of the base station determined as being used by the base station, the TDD configuration of the base station and the SSF configuration of the base station.

24. A wireless communication device comprising:
a receiver to receive signals from a base station of a Time Division Duplexing (TDD) wireless communication system; and
a processing device configured to determine a switching point from downlink (DL) to uplink (UL) for the base station,
wherein the processing device is configured to control:
detecting a cyclic prefix (CP) type based only on detection of a Primary Synchronization Signal (PSS) and a Secondary Synchronization Signal (SSS) of the base station;
determining a channel bandwidth used in the base station based on the CP type;
sampling a channel of the base station at a sampling rate corresponding to the channel bandwidth to obtain samples;
determining, from the samples, (i) each DL antenna port of the base station being used by the base station, (ii) TDD configuration of the base station, and (iii) Special Subframes (SSF) configuration of the base station; and
determining of the switching point based on the channel bandwidth, each DL antenna port of the base station determined as being used by the base station, the TDD configuration of the base station and the SSF configuration of the base station.

* * * * *